3,223,652
PREPARATION OF IRON GROUP
METAL CATALYSTS
Henry Erickson, Park Forest, and Robert A. Sanford, Homewood, Ill., assignors to Sinclair Research, Inc., Wilmington, Del., a corporation of Delaware
No Drawing. Filed Sept. 5, 1962, Ser. No. 221,420
9 Claims. (Cl. 252—439)

This invention relates to a novel method for the production of catalysts comprising a Group VIII iron group catalytically active metal component supported on a solid catalytic base material.

There have been many Group VIII metals catalysts prepared for use in a variety of chemical reactions. These catalysts are particularly useful in hydrocarbon hydrotreating operations, as for example, hydrodesulfurization, hydrodenitrogenation, destructive hydrogenation of metal-containing hydrocarbons, hydrogenation of olefins, aromatics, etc. and hydrogenolysis to cause carbon-carbon scission. The present invention concerns a novel method of preparing these catalysts so as to enhance their performance.

In accordance with the method of the present invention a solid catalytic base material is impregnated with a reducible iron group metal compound, e.g. an inorganic salt, and the impregnated support heated in the presence of a reducing gas at a temperature of about 500 to 1200° F., with the proviso that at temperatures above about 750° F. the reducing gas contains $H_2S$, and sulfiding, preferably at temperatures above 750° F., to provide the iron group metal on the base material as the sulfide. It is of importance to note that the processing of the catalyst in accordance with the present invention avoids exposure of the catalyst at elevated or calcining temperatures above 750° F. unless in the presence of $H_2S$ in amounts sufficient to avoid significant formation of metal oxide or free metal; preferably the gas is predominantly $H_2S$. Stated otherwise, the impregnated support is not subjected to conventional calcining with air or oxygen at temperatures above 750° F. or to a reduction operation employing temperatures above 750° F. without the presence of $H_2S$. Avoidance of subjecting the catalysts to calcination or reduction temperatures above 750° F. or alternatively conducting these heating operations in the presence of $H_2S$ when employing temperatures over about 750° F. up to about 1100 to 1200° F. or more is believed to eliminate or substantially eliminate the diffusion or migration of the metal component, primarily as the oxide or free metal, into the internal lattice of the support, that ordinarily ocurs in catalyst processing involving these elevated temperatures. Although diffused metal components may be reconcentrated at the surface of the support by subsequent heat treatment, it has been found that this subsequent heat treatment returns only a fraction of the diffused metal component to the surface where it is catalytically active. Thus, the method of the present invention provides a catalyst having a higher catalytic activity per weight of iron group metal salt impregnant than ordinarily obtained.

As previously indicated, the impregnating compound of the present invention is a reducible compound of the iron group metals (i.e. iron, cobalt and nickel) in Group VIII of the Periodic Table. The compounds are preferably water-soluble compounds as for instance the iron group metal acetates, sulfates, nitrates, halides, etc., although the substantially water-insoluble compounds of the promoting metals can be employed as well. The water-insoluble compounds are usually in the form of oxides, hydroxides, basic carbonates, etc. The preferred impregnants are nickel nitrate and nickel sulfate. By reducible compound is meant capable of being brought to the metallic form or a sulfide, under calcination at temperatures exceeding about 500° F. in the absence of a reducing gas. The amount of iron group metal added to the support is that sufficient to provide the support with catalytically effective amounts of the metal component. Generally, the catalyst prepared by the method of the invention will contain about 0.1 to 20 or more weight percent of the iron group metal.

If desired the catalyst of the invention can also contain other catalytically active components in addition to the iron group metals. The additional catalytic components can be deposited on the support by any method known to the art and need not be added in accordance with the method of the present invention but advantageously are so added. Preferred catalytically active metals which can be added in combination with the Group VIII metal are the metals of the fifth and sixth periods of Group VI(b), i.e. molybdenum and tungsten. Their addition can be separate from that of the iron group metal component addition or be simultaneous therewith. The sufide form of a combination of metal components can be provided in single or separate sulfiding operations. Alternatively, if desired, the second catalytic component can be initially deposited on the support as the sufide. Generally, if employed, any secondary catalytic metal component will be present in an amount of about 2 to 25 weight percent.

The support of the present invention can be any solid catalytic carrier material, preferably precalcined at a temperature of about 750 to 1300° F. or more. The carrier can be any catalytic adsorbent stable under the reaction conditions and non-deleterious to the desired properties of the finished catalyst. Suitable supports include, for instance, the refractory metal oxides having catalytic surface areas such as alumina, silica, magnesia, titania, zirconia, thoria or mixtures thereof. Where cracking activity is desired, the support may be composed of, for example, silica-alumina, silica-magnesia, fluoride-treated silica-alumina, fluoride or boria-promoted alumina, etc. Precalcination of the alumina in the form of one or more hydrates can convert it into activated or one or more of the gamma alumina forms.

The impregnation step of the present invention can be accomplished by any technique known in the art. Advantageously, the support is first evacuated to remove any volatile gases the support may contain. It is then covered with the aqueous solution of iron group metal compound, the vacuum released and the mixture of support and metal compound solution permitted to stand a few minutes.

Alternatively, should a water-insoluble compound be employed, an aqueous slurry of the compound is mixed with the support for at least about ten minutes at a temperature of about 125 to 210° F. Higher or lower temperatures can be employed, if desired. Temperatures above the boiling point of water may necessitate the use of superatmospheric pressures to maintain the liquid phase.

The impregnated support can then be heated in the presence of a reducing gas such as for example $H_2$, $SO_2$, etc. at temperatures of about 500 to 750° F. or alternatively at temperatures of about 500 to 1200° F. when the reducing gas is or contains $H_2S$. A drying step can be introduced prior to the reduction to remove water from the catalyst and if employed can be conducted at drying temperature ordinarily employed in catalyst processing, usually up to about 400° F., preferably about 200 to 250° F. The sulfiding step of the present method is also conventional and generally comprises contacting $H_2S$ with the reduced catalyst at temperatures of about 300 to 1000° F. or more; preferably about 300 to 700° F. It is to be understood that the reduction and sulfiding operations of the present invention can be conducted simultaneously if desired by employing $H_2S$ as the reducing agent in the reduction step of the method.

Catalyst prepared according to the method of the present invention has been found to be particularly useful for the removal of non-hydrocarbon impurities such as sulfur and nitrogen compounds and for the hydrogenation of unsaturated, i.e. olefinic and aromatic, hydrocarbons from a wide range of petroleum hydrocarbon stocks. The hydrocarbon stocks include mineral oil base stocks for lubricants, lighter petroleum distillates such as gas oil for catalystic cracking and hydrocracking, wax distillates from paraffin crudes, catalytically cracked distillates, coal tar distillates and the like. The processing conditions for the desulfurization, denitrogenation and hydrogenating will vary with the feedstock desired. Generally the temperatures will be in the range of about 400 to 850° F., preferably in the range of about 500 to 750° F., pressures may range from atmospheric or higher to about 5000 p.s.i.g., preferably about 400 to 2500 p.s.i.g. The weight hourly space velocity (weight of feed per weight of catalyst per hour, WHSV) can be in the range of about 0.1 to 20, preferably 0.1 to 10 WHSV. Suitable free hydrogen ratios are from 100 to 10,000 s.c.f. per b. of feed. The catalyst is macrosized and can be used as a fixed bed and the hydrogen treatment can be conducted in either the liquid and/or vapor phase.

The following examples are included to further illustrate the present invention:

EXAMPLE I 3 catalysts designated A, B and C were employed in the hydrogenation of a heavy vacuum distilled gas oil under the conditions shown in Table I below. The catalysts were prepared as follows:

*Catalyst A*

Catalyst A, a commercially available nickel-molybdenoxide on alumina catalyst having the following properties: percent nickel 6.13, percent $MoO_3$ 13.3, surface area 185 m.²/g. and total pore volume 0.6 cc./gm., was charged in a 200 g. quantity to a one-inch reactor tube and placed in a reactor furnace preheated to 700° F. The catalyst was pretreated by reducing with hydrogen for 2 hours at 700° F. and atmospheric pressure with 2 standard cubic feet of hydrogen/hour. The catalyst was then sulfided by passing 2 standard cubic feet per hour of hydrogen sulfide at 350° F. at atmospheric pressure. After sulfiding the catalyst was soaked for 4 hours at 350° F. and 500 p.s.i.g. with light cycle oil from a fluidized catalytic reactor.

*Catalyst B*

433 gms. of 1/16" alumina extrudate (2.5% volatile matter) dried for 2 hours at 200° F. were evacuated 30 minutes at 25 inches vacuum and covered with 1 liter of an ammoniacal (pH 9.0) solution containing 184 gms. $Ni(No_3)_2 \cdot 6H_2O$ and 149 gms. $MoO_3$. The vacuum was released and after standing 5 minutes, the impregnated extrudate was drained of excess liquid and dried 16 hours in a forced-draft oven at 230° F. The dried catalyst was calcined in air in an electric muffle for 6 hours at 500° F. and subsequently for 2 hours at 1050° F. The catalyst properties were: percent nickel 2.94, percent $MoO_3$ 11.6, surface area 247 m.²/gm. and total pore volume 0.68 cc./gm. The calcined catalyst was then reduced with hydrogen, sulfided and soaked in the same manner as Catlyst A.

*Catalyst C*

418 gms. of the same 1/16" dried alumina extrudate employed in Catalyst B was impregnated in actually the same manner employed in the preparation of Catalyst B, except that 135.5 gms. $NiSO_4 \cdot 6H_2O$ were substituted for the 184 gms. $Ni(NO_3)_2 \cdot 6H_2O$ employed in Catalyst B. The resulting catalyst was dried at 230° F. but was not calcined. The catalyst properties were 3.7% Ni and 14.5% $MoO_3$. The dried catalyst was then reduced with hydrogen, sulfided and soaked in the same manner as Catalysts A and B with the exception that prior to the reduction with hydrogen the tube furnace was cooled to 200° F. before inserting the catalyst containing reactor tube and the catalyst was brought up to 700° F. in 2½ hours with a hydrogen atmosphere. This variant was employed because of the higher volatile content of the uncalcined catalyst. Catalyst C exemplifies a product of this invention. The hydrogenation results obtained through use of the Catalysts A, B and C are shown in Table I below. The first column in the table recites the properties of the feedstock employed in the hydrogenation.

TABLE I

| Catalyst | None | A | B | C |
|---|---|---|---|---|
| Condtions: | | | | |
| Temperature, °F | | 675 | 672 | 680 |
| Pressure, p.s.i.g | | 1,000 | 1,000 | 1,000 |
| WHSV | | 3.01 | 3.01 | 2.99 |
| $H_2$ Rate, s.c.f./bbl | | 2,500 | 2,500 | 2,500 |
| Analysis of Liquid: | | | | |
| A.P.I. Gravity | 23.3 | 25.5 | 25.6 | 26.1 |
| Percent Hydrogen | 12.39 | 12.71 | 12.68 | 12.80 |
| Percent Sulfur | 1.19 | 0.33 | 0.25 | 0.15 |
| Percent Nitrogen | 0.18 | 0.16 | 0.15 | 0.14 |
| Liquid Yield, Wt. Percent | | 99.22 | 99.06 | 98.87 |
| $H_2$ consumption, s.c.f./bbl | | 230 | 160 | 270 |

The data of Table I demonstrate the superior performance of Catalyst C as exemplified by the higher API gravity and higher hydrogen content of the liquid product together with the improvement in sulfur and nitrogen reduction.

EXAMPLE II

The catalyst of the present invention can also be prepared as follows:

418 grams of dried 1/16" alumina extrudate is first impregnated with an aqueous solution of 184 grams of $Ni(NO_3)_2 \cdot 6H_2O$ and dried at 230° F. The dried catalyst is then reduced by heating the impregnated catalyst in the presence of $H_2S$ at a temperature of 900° F.

It is claimed:

1. A method for the preparation of a catalyst consisting essentially of a catalytic amount of an iron group metal supported on a solid catalyst base which consists essentially of impregnating a solid catalyst support with a reducible iron group metal compound, heating said impregnated support in the presence of a reducing gas at temperatures of about 500 to 1200° F., sulfiding the catalyst with $H_2S$ to provide the iron group metal on the support as the sulfide, with the proviso that at temperatures above about 750° F. $H_2S$ is added to the reducing gas to provide simultaneous reduction and sulfiding.

2. The method of claim 1 wherein the iron group metal is nickel.

3. The method of claim 1, wherein the reducing gas is hydrogen and the temperature is about 500 to 750° F.

4. The method of claim 1, wherein the solid catalyst support is calcined alumina.

5. The catalyst produced by the method of claim 1.

6. The catalyst produced by the method of claim 2.

7. The catalyst produced by the method of claim 4.

8. A method for the preparation of a catalyst consisting essentially of a catalytic amount of an iron group metal supported on a solid catalyst base which consists essentially of impregnating a calcined alumina support with an aqueous medium containing a reducible nickel compound, heating said impregnated support in the presence of a reducing gas at temperatures of about 500 to 750° F. and sulfiding with $H_2S$ to provide the nickel on the support as the sulfide.

9. A method for the preparation of a catalyst consisting essentially of a catalytic amount of an iron group metal supported on a solid catalyst base which consists essentially of impregnating a solid catalyst support with an aqueous medium containing a reducible iron group metal compound, heating said impregnated support in the presence of a reducing gas at temperatures of about 500 to 1200° F., sulfiding the catalyst with $H_2S$ to provide the iron group metal on the support as the sulfide, with the proviso that at temperatures above about 750° F. $H_2S$ is added to the reducing gas to provide simultaneous reduction and sulfiding.

References Cited by the Examiner

UNITED STATES PATENTS

| 3,024,188 | 3/1962 | Yeo et al. | 208—217 |
| 3,098,829 | 7/1963 | White et al. | 208—217 |
| 3,113,096 | 12/1963 | White | 208—213 |

ALPHONSO D. SULLIVAN, *Primary Examiner.*

UNITED STATES PATENT OFFICE
CERTIFICATE OF CORRECTION

Patent No. 3,223,652                        December 14, 1965

Henry Erickson et al.

It is hereby certified that error appears in the above numbered patent requiring correction and that the said Letters Patent should read as corrected below.

Column 2, line 2, for "absence" read -- presence --.

Signed and sealed this 10th day of January 1967.

(SEAL)
Attest:

ERNEST W. SWIDER                        EDWARD J. BRENNER
Attesting Officer                           Commissioner of Patents